United States Patent [19]

Rude

[11] 4,126,428
[45] Nov. 21, 1978

[54] COATED ABRASIVE CONTAINING ISOCYANURATE BINDER AND METHOD OF PRODUCING SAME

[75] Inventor: Harold E. Rude, Roseville, Minn.

[73] Assignee: Minnesota Mining and Manufacturing Company, St. Paul, Minn.

[21] Appl. No.: 820,827

[22] Filed: Aug. 1, 1977

Related U.S. Application Data

[63] Continuation-in-part of Ser. No. 648,899, Jan. 14, 1976, abandoned.

[51] Int. Cl.² ............................................. C09K 3/14
[52] U.S. Cl. ............................. 51/295; 51/298 R; 51/300; 51/301
[58] Field of Search ............... 51/295, 298, 296, 300, 51/301

[56] References Cited

U.S. PATENT DOCUMENTS

| | | | |
|---|---|---|---|
| 2,806,772 | 9/1957 | Robie | 51/296 |
| 2,881,065 | 4/1959 | Reuter | 51/298 |
| 3,502,453 | 3/1970 | Baratto | 51/305 |
| 3,806,327 | 4/1974 | Farmer | 51/295 |
| 3,872,629 | 3/1975 | Malloy | 51/295 |
| 3,963,458 | 6/1976 | Gladstone | 51/295 |
| 4,011,063 | 3/1977 | Johnston | 51/298 |

FOREIGN PATENT DOCUMENTS 1,398,244  6/1975  United Kingdom ..................... 51/298

*Primary Examiner*—Donald J. Arnold
*Attorney, Agent, or Firm*—Cruzan Alexander; Donald M. Sell; Richard Francis

[57] ABSTRACT

In an improved coated abrasive, abrasive granules are bonded to a backing sheet by an isocyanurate resin. Bonding is accomplished by use of a one-part, latent, room-temperature stable isocyanate system trimerizable to polyisocyanurate. The trimerizable system comprises an aromatic isocyanate having dispersed throughout the liquid, mircocapsules containing a catalyst for isocyanurate formation. The microcapsules have a permeable shell wall essentially of partially polymerized aromatic isocyanate which encapsulates the liquid catalyst at room temperature but, on activation of the isocyanate-catalyst by a suitable force, the liquid catalyst permeates the shell wall, mixes with the liquid polyisocyanate, and cures the isocyanate to a fully cured thermoset isocyanurate resin.

11 Claims, No Drawings

COATED ABRASIVE CONTAINING ISOCYANURATE BINDER AND METHOD OF PRODUCING SAME

RELATED PRIOR APPLICATIONS

This application is a continuation-in-part application of prior copending application Ser. No. 648,899, filed Jan. 14, 1976 now abandoned.

BACKGROUND OF THE INVENTION

1. Field of the Invention

This invention relates to coated abrasive products having an isocyanurate resin binder which holds and supports a coating of abrasive granules on a backing sheet. In another aspect, the invention relates to a method for making such a coated abrasive product employing a one-part isocyanatecatalyst system curable to isocyanurate resin wherein the catalyst is encapsulated.

2. Prior Art

Coated abrasives generally comprise a flexible backing upon which adhesive holds and supports a coating of abrasive granules. The backing may be paper, cloth, film, vulcanized fiber, etc. or a combination of one or more of these materials. The abrasive granules may be formed of flint, garnet, aluminum oxide, alumina:zirconia, diamond, silicon carbide, etc. Popular present day binders are phenolic resins, hide glue and varnish. Phenolic resins preferably include those of the phenolaldehyde type. Besides phenolic resins, hide glue and varnish, other known resinous binder materials employed in the preparation of coated abrasive products include epoxy resins, ureaformaldehyde and polyurethane resins.

The coated abrasive may employ a "make" coat of resinous binder material which is utilized to secure the ends of the abrasive granules onto the sheet as the granules are oriented and a "size" coat of resinous binder material over the make coat which provides for firm adherent bonding of the abrasive granules to the sheet. The size coating resin may be the same as the make coating resin or of different resinous material.

The popular presently used binders for coated abrasives have many disadvantages. Hide glue make coatings are generally required to be applied hot (about 150° F.) and must be cooled below their gel temperature before another coat can be applied. Hide glue size coatings are also generally applied hot, requiring drying times on the order of 30 minutes to 2 hours at 100°-135° F. Hide glue is also water-soluble and may result in removal of the abrasive granules upon exposure to moisture. Varnish make coatings generally require cure or drying times of about 8 hours at about 195° F. (90° C.). Phenolic size coatings require at least about 2 hours to cure at 195° F. Phenolic make coatings are also usually pre-cured for at least one hour.

At first, polyisocyanurate resin may be thought to be a very likely candidate for the binder material of coated abrasive products, especially in view of the teaching of assignee's British Pat. No. 1,398,244. This patent discloses preparation of low-density abrasive products utilizing isocyanurate but not coated abrasives. This speculation has proven false because of the peculiar nature of the catalysts used to form this resin from the isocyanate starting material. The known catalysts for trimerizing isocyanates can be divided into two general classes. First, those which rapidly trimerize isocyanate exothermically at room temperature, and, second, those which trimerize isocyanates only at elevated temperatures and with prolonged reaction times. The first group of catalysts lacks latency and therefore their use is generally limited to two-part compositions with the parts mixed together very shortly before use. The second group of catalysts generally have a short shelf life, e.g., several weeks after mixing with the isocyanate starting materials, and requires long cure times, on the order of several hours at elevated temperatures.

An adhesive binder system which has a rapid cure (fast reaction rate) is desired in the production of coated abrasive products. Too rapid a cure would be incompatible with presently used production methods because it will cause advancement of the resin viscosity and perhaps result in failure to properly secure the abrasive granules to the substrate backing or foul coating equipment with prematurely cured adhesive. Both of these situations would be intolerable since isocyanurate is a thermoset material which is difficult to remove. Certain methods of metering have been developed to meter out stoichiometric quantities of isocyanate and catalyst. These methods, however, have generally been found to be unsuitable for the preparation of coated abrasive products because of application difficulties and resin waste.

The use of the second group of catalysts to prepare coated abrasive products is unacceptable because of the stringent cure conditions required which often result in unacceptable degradation of the backing. Additionally, the long cure times would make the process for producing such abrasive products uneconomical since prolonged time in the curing oven would be required with attendant increases in energy use and equipment costs.

SUMMARY OF THE INVENTION

An improved coated abrasive employing an isocyanurate resin binder is provided by the present invention. Binding is accomplished by the use of a one-part, latent, room-temperature stable isocyanate system trimerizable to polyisocyanurate. The trimerizable system, described in assignee's U.S. Pat. No. 3,860,565, the disclosure of which is incorporated herein by reference, comprises an aromatic isocyanate having dispersed throughout the liquid, microcapsules of a catalyst for isocyanurate formation. The microcapsules have a permeable shell wall essentially of partially polymerized aromatic isocyanate which encapsulates the liquid catalyst at room temperature but, on activation of the isocyanate-catalyst by a suitable force such as heat, the liquid catalyst permeates the shell wall, mixes with the isocyanate, and cures the isocyanate to a fully cured thermoset isocyanurate resin.

The use of the aforementioned encapsulated isocyanate-catalyst system overcomes the problems associated with each of the two types of isocyanate catalysts described above. With this system, coated abrasive products can be made employing an isocyanurate resin binder. The unique characteristic of the system, which permits curing to be triggered upon application of the suitable force such as heat, provides control over the curing time of the isocyanate heretofore never realized in the production of coated abrasive products, making possible production of isocyanurate binder-containing coated abrasive products.

The coated abrasive products according to the invention are characterized by having at least a make coating or a size coating of isocyanurate binder. This binder layer contains a plurality of minute microcapsules which formerly contained catalyst (and which may contain residual catalyst) dispersed uniformly throughout the cured composition.

The conventional components going to form the coated abrasive product of the invention will be selected from those typically used in this art. The backing, as previously mentioned, may be formed of paper, cloth, vulcanized fiber, film or any other backing material known for this use, although special precautions may be necessary if the backing is high in moisture content. The abrasive granules may be of any conventional grade utilized in the formation of coated abrasives and may be formed of flint, garnet, aluminum oxide, alumina:zirconia, diamond and silicon carbide, etc., or mixtures thereof. The frequency of the abrasive granules on the sheet will also be conventional. The abrasive granule may be oriented or may be applied to the backing without orientation, depending upon the requirements of the particular coated abrasive product. Either the make coat or the size coat of the coated abrasive product may be formed of a resinous material known for this use, the remaining coat, of course, being formed of isocyanurate, according to the invention. Some of the water-based size coats, e.g., glue and urea-formaldehyde, exhibit marginal adhesion to the make. Both the make and the size coat may be formed of isocyanurate.

The use of isocyanurate binder for coated abrasives according to the present invention avoids many of the problems which plague binders generally used in coated abrasives. Isocyanurate does not require prolonged heating and/or dwell times before subsequent coatings may be applied to make coatings. Unlike glue, isocyanurate is unaffected by moisture. In fact, coated abrasive products having isocyanurate as a binder perform well under wet grinding conditions. Unlike varnish, isocyanurate may be applied with little or no solvent and may be cured in a much shorter processing time. Varnish softens during wet grinding while the isocyanurate is not deleteriously affected. Curing of isocyanurate is accomplished much more rapidly than phenolic resin.

The coated abrasive product of the invention may also include such modifications as are known in this art. For example, a back coating such as pressure-sensitive adhesive may be applied to the nonabrasive side of the backing and various supersizes may be applied to the abrasive surface, such as zinc stearate to prevent abrasive loading, and others.

The isocyanate trimerization catalysts used in the latent, one-part, triggerable isocyanate-catalyst capsules employed in making the binder of the coated abrasive products of this invention comprise a viscous liquid catalyst solution, preferably a solution of an alkali metal salt of an organic acid, encapsulated in microcapsules. The microcapsules are prepared in situ, in a polyisocyanate material, by the addition of the liquid catalyst to the polyisocyanate under conditions of shear. During catalyst addition, the polyisocyanate is maintained at a temperature above the melting point of the polyisocyanate material but below about 50° C., and preferably below about 40° C., to avoid premature trimerization of the polyisocyanate. The microcapsules prepared under these conditions have a shell wall which is essentially partially polymerized aromatic isocyanate. The wall is of such a nature that it isolates the viscous solution of alkali metal salt at temperatures below about 50° C. However, at temperatures above about 75° C. the viscosity of the alkali metal salt solution is reduced to less than about 5,000 centipoise, allowing the alkali metal salt solution to penetrate the shell wall, mix with the isocyanate material, and initiate polymerization of of the aromatic polyisocyanate material.

Suitable alkali metal salts for use in a liquid catalyst solution are those alkali metal salts of organic acids having a $pK_a$ between about 2.5 and 10, preferably between about 3 and 6. The acids with a $pK_a$ of about 3-6 provide catalysts that are easily synthesized, give good shelf stability when dispersed in isocyanate materials, yet cure rapidly when activated.

Generally speaking, the alkali metal salts used in this invention are alkali metal salts of mono- or polycarboxylic acids and phenols having from 2 to about 8 carbon atoms and are preferably mono- and polycarboxylic acids having 2 to 5 carbon atoms. The alkali metal salts of organic acids having more than about 8 carbon atoms generally have a higher solubility in isocyanates, and the metal salt is extracted from droplets of catalyst solution before a coherent shell wall can be formed about the droplet. When it is desired to use acids having more than 8 carbon atoms this excessive solubility of the Na and K salts of such acids in isocyanates can at least partially be overcome by using the lithium salt of these acids.

Examples of suitable alkali metal salts for use in this invention include sodium lactate, potassium lactate, rubidium lactate, potassium glycolate, potassium hydroxy-isobutyrate, potassium 2-hydroxypropionate, potassium acetate, potassium butyrate, sodium butyrate, lithium ocotate, potassium cyanoacetate, dipotassium oxalate, disodium succinate, dilithium adipate, dipotassium adipate, potassium mandelate, disodium phthalate, sodium phenoxide, potassium p-chlorophenoxide, sodium m-cresoxide, and the like.

The solubility of the alkali metal salt catalysts in polyols is such that the catalyst solution will generally contain more than 15 percent by weight salts, preferably about 50–75 percent by weight or more. The resulting solutions will generally have a viscosity of at least 5,000 centipoise or greater at temperatures up to about 50° C., preferably a viscosity greater than about 100,000 centipoise at temperatures up to about 40° C. The lower viscosity materials yield microcapsules that give partially and non-homogeneously cured resins even after prolonged heating at elevated temperatures. Furthermore the shelf stability of these catalysts is significantly reduced as compared to the higher viscosity liquid catalyst solutions.

Solvents which can be used to dissolve the alkali metal salts, to form a viscous catalysts solution, are generally polar organic compounds and preferably have a boiling point sufficiently higher than water so that the solvent can be made essentially anhydrous, i.e., have a water content of one percent or less, by azeotropic distillation. Examples of such solvents include lower polyhydric alcohols having 2 to about 8 carbon atoms, such as ethylene glycol, propylene glycol, glycerin, 1,4-butanediol, 1,2,4-butanetriol, 2,2'-oxydiethanol, 3,3'-oxydipropanol, 1,1,1-trimethylolpropane, 1,2,3-trimethylolpropane, and the like and mixtures of such polyhydric alcohols; formamide, N-methyl-formamide, ethylene carbonate, 4-butyrolactone, pyrrolidone, N-methyl pyrrolidone, and the like and mixtures of such solvents. The preferred solvents are the lower polyhydric alcohols, and glycerol is the most preferred.

A preferred catalyst solution is an alkali metal salt of lactic acid in glycerol. This catalyst solution, when dispersed in polyisocyanate, especially "Mondur" MRS, gives consistently good catalyst-containing capsules which are efficient in releasing the catalyst and giving cured resins with good physical properties, including thermal stability, hydrolytic stability and useful dielectric properties.

The catalyst solution can be directly synthesized by mixing the alkali metal salt and solvent or alternatively, the viscous catalyst solution may be prepared by reacting alkali metal salt precursors in a solution of the selected solvent to form the desired catalyst and subsequently azeotroping off any resulting water using an azeotroping fluid such as toluene to form a substantially anhydrous catalyst solution. After azeotroping, any remaining organic solvents can be removed, e.g., by means of vacuum distillation. For example, a potassium lactate-glycerol catalyst solution can be prepared by reacting an aqueous solution of lactic acid with potassium hydroxide in a minimum of water and glycerine. Toluene is added to the mixture, and the reaction vessel is fitted with a water separator. The solution is then azeotroped until no more water can be driven off the reaction mixture. At this point, the solution generally contains 1% or less of water. After the water is removed, the toluene is removed by reduced pressure distillation.

The encapsulation of the isocyanate trimerization catalyst solution using a polyisocyanate can be performed in batches or continuously. In any event, a unit capable of providing a fine dispersion of the catalyst solution in the aromatic polyisocyanate is required for encapsulation, such as a high shear mixing apparatus, e.g., a blender, which will break the catalyst solution into a very fine dispersion. After the catalyst solution is dispersed in the polyisocyanate, a capsule shell wall forms around each droplet of catalyst solution as a result of the reaction of the isocyanate at the droplet's surface. There is a catalyzed trimerization of the isocyanate to form isocyanurate, and polymerization of the glycol, when used as solvent, with isocyanate to form urethane or isocyanurate-modified urethane. During formation of the capsule wall, there is a mild exotherm, and the temperature of the system is controlled so that it does not rise above about 50° C. and preferably does not rise above about 40° C. to prevent premature triggering of the entire isocyanate-catalyst. After the catalyst dispersion is formed, further blending is avoided to prevent rupture of the forming shell walls.

The capsules obtained are a distribution of sizes generally ranging from about 1 to 20 microns in diameter. Because the capsules are small they can be evenly dispersed throughout the isocyanate material to provide a rapid, complete cure when activated. The preferred range of capsule diameters is about 1–10 microns, these diameters being easily dispersed; however, larger and smaller capsules also give useful isocyanate-catalyst compositions. The larger diameter capsules are produced by lower shear and vice versa. The formed capsules may be produced in concentrations of about 0.1–30 percent by weight of catalyst in the isocyanate. The capsules can be diluted with more polyisocyanate to reduce the catalyst concentration present. The amount of catalyst contained in the diluted isocyanate-catalyst systems is generally about 0.1–5 percent by weight of the isocyanate material to be trimerized. Functionally stated, the amount of catalyst present is preselected to be that amount which will catalyze a particular isocyanate material to a fully cured isocyanurate resin. Simple empirical tests are adequate to show the amount of encapsulated catalyst needed in any given system.

The aromatic polyisocyanate materials which can be trimerized to isocyanurates with the encapsulated catalysts of this invention are known. Particularly useful isocyanates can be represented by the formula $R(NCO)_n$ where R is aryl or alkyl substituted alkaryl and n is 2 to 5 or higher. Examples of such isocyanates are 2,4- and 2,6-tolylene diisocyanates; 1,5-naphthalene diisocyanate; 4,4-diisocyanto-diphenylmethane and 3,3'-dimethyl-4,4'-diphenylene diisocyanate. The so-called polymeric polyisocyanates can also be used, such as those obtained by phosgenation of polyamines, prepared by condensing formaldehyde with aromatic amines. Particularly useful polymeric polyisocyanates are the polymethlene polyphenyl polyisocyanates such as those sold commercially under the trademarks "Mondur" MR and MRS, (available from Mobay Co.), 901 and 390 P and "PAPI" (available from Upjohn). Lists of commercially available polyisocyanates are found in Kirk and Othmer, Encyclopedia of Chemical Technology, Vol. 12, 2nd Ed., pp. 46–47, Interscience Publishers (1967), and Appendix A of Saunders and Frisch, Polyurethanes: Chemistry and Technology, Part 1, Interscience Publishers, New York (1962); and the polyisocyanate materials therein described can be used in this invention.

Urethane prepolymers, sometimes referred to as isocyanate-terminated prepolymers, can also be trimerized and are known (e.g., see U.S. Pat. Nos. 3,073,802 and 3,054,755), such prepolymers being prepared by reacting aromatic or so-called polymeric polyisocyanates with a polyol such as polyoxyalkylene polyol, typically polyoxypropylene glycol, using excess isocyanate. Mixtures of polyisocyanates or polyols can be used to prepare isocyanate-terminated prepolymers. In addition to polyoxyalkylene polyols, polyesters and polyamides containing reactive hydroxyl groups can be used.

Suitable polyols for use in isocyanate-terminated urethane prepolymers can have varying molecular weights, for example between 90 and 3,000 or even as high as 5,000. Where a harder polyisocyanurate is desired, the polyol will generally have a hydroxyl equivalent weight of about 45–400 (i.e., 1 reactive hydroxyl group per 45–400 molecular weight of polyol). Where a softer, tougher polyisocyanurate is desired, the polyol will generally have a molecular weight of 400 to 1,000 or higher. The polyoxyalkylene polyols are generally condensates of ethylene, propylene or butylene oxides with glycerol, pentaerythritol, sorbitol, sucrose, methyl-glucosides or low molecular polyols, such as propylene glycol, tri-, tetra-, penta-, hexa-methylene glycols, 1,3-butylene glycol, 1,3(2-ethyl)hexanediol, 2,2,4-trimethyl-1,3-pentanediol, trimethylol propane, 1,2,6-hexanetriol, or phenyldiisopropanolamine.

Where the isocyanate-terminated urethane prepolymer is made from polyisocyanate-polyol reaction mixtures, the mixtures can have NCO/OH equivalent ratios greater than 1, preferably at least 1.2/1 to 6/1. Generally, the greater the amount of isocyanurate in the resulting product the greater its hardness. The preferred products are those which are highly crosslinked by reason of having about 20% to 85% of the isocyanate groups in the reaction mixture converted to isocyanurate linkages or when moisture is present during polymermization, also urea linkages.

Where a more highly crosslinked polymer is desired a polyol-diisocyanate starting mixture can include a conventional triisocyanate or triol. The mixture can also include modifying mono-isocyanates or alcohols such as 1,4-butane diol, butyl "Cellosolve," butyl "Carbitol" and oleyl alcohol to impart special properties to the polymer product, such as the degree of final hardness.

Many conditions are suitable for activating the one-part, encapsulated catalyst-isocyanate system, e.g., mechanical shear, thermal, solvent, ultrasonic, microwave and dielectric means. Thermal activation, the preferred condition for the present invention, requires that the encapsulated composition be heated above ambient temperature, such as above 50° C. and preferably above about 75° C., for a sufficient length of time to achieve release of the catalyst from the capsule and initiate trimerization. Once trimerization is initiated, the reaction is exothermic and will continue to completion even though the activating condition is removed.

Gel times of the isocyanate, after activation, are usually a few seconds with complete curing being achieved in a few minutes depending on the amount of catalyst released and the temperature during cure.

A further understanding may be had by reference to the following nonlimiting examples in which all parts are by weight unless otherwise noted.

Isocyanate-Catalyst Preparation

A. LACTATE

A variable speed laboratory type "Waring Blender" having a capacity of approximately 1 liter was charged with 17.46 parts of "Mondur" MRS (a polymethylene polyphenyl polyisocyanate having an isocyanate functionality of about 2.7). The blender was turned on and its speed increased to maximum followed by the rapid addition of 2.54 parts of a solution containing 70.86 percent by weight potassium lactate in glycerol, over a period of about one-fourth minute. A fine dispersion of liquid catalyst droplets was formed in the isocyanate. The blender was stopped and the dispersion degassed in a vacuum desiccator. Upon standing at room temperature, an encapsulating shell formed around each droplet by reaction of the catalyst solution with isocyanate material. The resulting dispersion, an isocyanate-catalyst concentrate, contained approximately 9 percent by weight encapsulated potassium lactate which could be used as a resin or diluted with more polyisocyanate or isocyanate-terminated prepolymer composition to form useful compositions.

Two parts of the isocyanate-lactate catalyst concentrate was diluted with 8 parts of an isocyanate-terminated prepolymer made by reacting 75 parts of "Mondur" MRS with 25 parts of a 1500 molecular weight triol, having an equivalent weight of 500 and being prepared from trimethylol propane, propylene oxide and potassium hydroxide, to obtain a coating mixture hereinafter identified as mixture "A," having approximately an 80:20 isocyanate polyol ratio. A thin film of mixture "A" was cured by placing in an oven at 90° C. for 2 minutes. The cured polyisocyanurate resin obtained had an average Knoop hardness number of 21.

B. BORATE

As described immediately above, 300 parts of "Mondur" MRS was blended with 46 parts of a liquid catalyst solution containing 40 percent by weight glycerol:boric acid ester:KOH complex in glycerol over a period of about one-fourth minute. The liquid catalyst solution was prepared by treating 326 parts of glycerin in about 75 parts toluene with 61 parts of boric acid in the presence of 0.5 parts p-toluenesulfonic acid catalyst. This solution was azeotroped to dryness and then 56 parts of potassium hydroxide was added portionwise at reflux over about 30 minutes. This solution was again azeotroped to dryness and the toluene removed on a rotary evaporator to yield the viscous, syrupy catalyst solution. A fine dispersion of liquid catalyst droplets was formed in the isocyanate. Upon standing at room temperature, an encapsulating shell formed around each droplet which occurred by reaction of the catalyst solution with isocyanate material. The resulting dispersion, an isocyanate-catalyst concentrate, contained approximately 5.3 percent by weight encapsulated borate catalyst described above which could be used as a resin or diluted with more polyisocyanate or isocyanate-terminated prepolymer composition to form useful compositions.

Thirty parts of this isocyanate-catalyst concentrate was diluted with 30 parts of an isocyanate-terminated prepolymer made by reacting 70 parts of "Mondur" MRS with 30 parts of a 1500 molecular weight triol having an equivalent weight of 500, having been prepared from trimethylolpropane, propylene oxide and potassium hydroxide, to obtain a mixture hereinafter identified as mixture "B". A small portion of mixture "B" was easily cured to a rigid, hard polymer by placing in an oven at 300° F. (150° C.) for several minutes.

EXAMPLES 1-9

A saturated water proof coated abrasive paper backing (58.5 pound — 26.54 kg — per 480 sheet ream) was coated with a mixture of 15 parts xylene and 85 parts mixture "A" to provide a coating weight before drying of 3½ grains per 4-inch by 6-inch segment, about 150 mg per sq. decimeters, and grade 280 silicon carbide abrasive material was electrostatically deposited upon the freshly coated surface to provide an abrasive coating weight of 24 grains per 4 × 6 inch segment (about 1 gram per square decimeter). The resinous coating was then cured in a forced air oven with a first zone heated at 350° F. (177° C.) with a 20 second residence time therein, and a second zone heated at 250° F. (121° C.) with a 10 second residence time therein. Thereafter a size coating having a weight upon drying of 11½ grains per 4-inch by 6-inch segment (about 480 milligrams per square decimeter) of the same coating mixture was applied to the abrasive covered surface of the cured composite. The size coating was cured at 220° F. (104° C.) for 20 minutes.

Following the procedure of Example 1, additional coated abrasive products, identified herein as Examples 2-9, were prepared. The specifications of Examples 1-9 are set forth in Table I along with specifications of Control Examples AA, A, B and C. Control Examples AA and A have a paper backing and varnish make and size coats. Control Example B has an "X" weight cloth backing and glue make and size coats. Control Example C has a "D" weight paper backing and glue make and size coats. Control Examples A-C were prepared according to well recognized methods used in present-day coated abrasive fabrication.

Test strips of these Examples were cut and installed in a testing machine for evaluation of abrasiveness. The testing machine comprised a sponge-faced metal shoe upon which an abrasive coated sample was applied and the shoe was urged with a load of 8 pounds against the surface of enameled steel test panels. In operation, the shoe carrying the coated abrasive sheet reciprocates across and against the enameled coated surfaces of the panels and the area from which the enamel was removed from each of the steel test panels was measured, the number of cycles being the same for a particular set of test samples and its control. These areas were compared with the areas obtained by use of similar control examples of the same construction except employing known conventional resins for the size and make coats. The areas obtained by use of the example are reported in Table II below compared to the area obtained by the control examples. The areas are reported as the normalized values in percent. That is, the area removed by the control sample taken as 100% and the test sample area is reported relative to the control area.

TABLE 1

| Example No. | Backing | Make Resin | Size Resin | Mineral | Grade | Abrasive Coating Weight (g/dm$^2$) |
|---|---|---|---|---|---|---|
| Control AA | Paper[1] | varnish | phenolic[4] | SiC | 280 | 0.8 |
| 1 | " | isocyanurate[1] | isocyanurate[1] | " | 280 | 1.0 |
| 2 | " | varnish | " | " | 280 | 0.8 |
| 3 | " | isocyanurate[1] | phenolic[4] | " | 280 | 1.0 |
| Control A | " | varnish | phenolic[4] | " | 240 | 0.8 |
| 4 | " | isocyanurate[5] | isocyanurate[6] | " | 240 | 0.7 |
| Control B | Cloth (X)[2] | glue | glue | Al$_2$O$_3$ | 60 | 2.7 |
| 5 | " | isocyanurate[7] | isocyanurate[5] | " | 60 | 2.6 |
| Control C | Paper(D)[3] | glue | glue | " | " | 2.7 |
| 6 | " | isocyanurate[7] | isocyanurate[5] | " | " | 2.6 |
| 7 | " | " | epoxy-Versamide | " | 36 | 5.2 |
| 8 | " | isocyanurate[8] | " | " | " | 5.5 |
| 9 | " | filled isocyanurate[9] | " | " | " | 5.4 |

[1]Described in Ex. 1
[2]"X" weight cloth.
[3]"D" weight paper.
[4]Plasticized phenol-aldehyde resole.
[5]Described in Ex. 1 except coating mixture 90 parts mixture "A": 10 parts xylene.
[6]Described in Ex. 1 except coating mixture 87 parts mixture "A": 13 parts xylene.
[7]Described in Ex. 1 except coating mixture 100 parts mixture "A" and no xylene.
[8]Prepared as Ex. 1 except using 60:40 "Mondur" MRS: 2000 MW diol.
[9]67 parts of mixture "A"; 28 parts silicate filler ("Minex" 7) and 5 parts xylene.

TABLE II

| Example No. | Relative Abrasiveness (%) | | |
|---|---|---|---|
| | Panel 1 | Panel 2 | Panel 3 |
| 1 | 107 | 90 | 104 |
| 2 | 120 | 108 | 97 |
| 3 | 130 | 100 | 86 |
| 4 | 101 | 100 | 89 |

Control Example B and Example 5 were cut into 3-inch by 159-inch (7.6 cm by 4.039 meter) strips and each strip was joined at its ends to form belts which were mounted on a platen-backed belt sander. Each belt was operated at 3690 sfpm (1.125 km per minute) and utilized to abrade a 7.1 square inch surface of an oak block which was forced against the belt at a pressure of 1.65 psi (0.12 kg per sq cm). The amount of material removed was measured after 16 minutes of abrading time for each sample. Control B removed 583 grams and Example 5 removed 616 grams.

Control Example C and Examples 6–9 were utilized to abrade a ½-inch (12.7 mm) thick coating of a commercial polyester body filling compound on a steel test panel. For this test, a 3-inch by 5-inch (7.5 cm by 12.5 cm) test sample was attached to a "Jitterbug" sanding device which moved in reciprocating cycles across the workpiece. The workpiece was moved in reciprocating cycles at right angles to the reciprocating movement of the sander. The force between the device and the compound surface was 8 pounds (3.6 kg). The amount of material abraded after 15 minutes was measured for each example. The results are shown in Table III below:

TABLE III

| Example No. | Amount of Material Abraded (grams) | Abrasive Grade |
|---|---|---|
| Control C | 74 | 60 |
| 6 | 80 | 60 |
| 7 | 81 | 36 |
| 8 | 85 | 36 |
| 9 | 79 | 36 |

As can be seen from the comparative evaluation of Example 6 and Control Example C set forth above, a coated abrasive product employing isocyanurate binder has performance equivalent to or better than a coated abrasive product employing glue binder material. Examination of the test results of Examples 7–9 reveals that filled isocyanurate resin and isocyanurate resins prepared from varying ratios of isocyanate and polyol are equally useful in the practice of this invention.

EXAMPLE 10

Example 10 was prepared by coating 48 pound per 480 sheet ream barrier coated paper with the coating composition described in Example 1 (except the coating composition was 90 parts mixture "A" in 10 parts xylene) to provide a wet coating weight of 4½ grains per 4-inch by 6-inch segment (189 mg per sq. decimeter). The resultant coated paper sheet was electrostatically coated with grade 180 aluminum oxide, cured at 220° F. (104° C.) for 10 minutes, size coated with 10 grains per 4-inch by 6-inch segment (420 mg per sq. decimeter) wet weight of the above coating composition and the size coat was cured at 220° F. (104° C.) for 15 minutes. A supersize coating of zinc stearate was applied over the abrasive coated surface to provide a reflectance of 1020. The resultant coated abrasive product was compared to a similar product prepared utilizing glue as a make and size coat. Comparison was made by utilizing a "Jitterbug" sander with a total orbital movement of ½ inch (1.3 cm). Abrasive test samples, 2-inch by 5-inch (5 cm by 13 cm), mounted on the moving face of the sander were urged against the surface of a multi-layered acrylic lacquered steel panel under a force of 8 lbs. per sq. inch until the top three layers of lacquer had been removed, noting the time to remove these three layers.

Control Examples D-H and Examples 11-14 were prepared and evaluated in the same manner, although in some cases the number of acrylic lacquer layers differed from that noted above. The number of layers for a particular test sample according to the invention was the same as a similar control sample. Additionally, both the make and size coat resins of Examples 11 and 12 were cured only for 10 seconds at 350° F. (177° C.) in a first zone and for 14 seconds at 250° F. (121° C.) in a second zone, rather than employing the cure conditions of Example 10. Specifications of Example 10 and these Examples appear in Table IV. Test results of comparative evaluations of these Examples appear in Table V. As can be seen from the data shown in Table V, the test samples containing isocyanurate binder consistently perform equivalent to or better than samples containing binder material common to the industry such as glue.

TABLE IV

| Example No. | Backing | Make Resin | Make Coating Wt. (mg./sq., decimeter) | Size Resin | Size Coating Wt. (mg./sq., decimeter) | Abrasive Grade | Abrasive Coating Wt. (mg./sq., decimeter) |
|---|---|---|---|---|---|---|---|
| Control D | D wt. paper | glue | — | glue | — | 180 | 586 |
| 10 | " | isocyanurate[1] | 189 | isocyanurate[1] | 420 | 180 | 545 |
| Control E | " | glue | — | glue | — | 80 | 1760 |
| 11 | " | isocyanurate[2] | 210 | isocyanurate[3] | 1050 | 80 | 1070 |
| Control F | " | glue | — | glue | — | 60 | 2640 |
| 12 | " | isocyanurate[4] | 398 | isocyanurate[3] | 1050 | 60 | 2560 |
| Control G | A wt. paper | glue | — | glue | — | 120 | 922 |
| 13 | " | isocyanurate[1] | 251 | isocyanurate[1] | 545 | 120 | 838 |
| Control H | " | glue | — | glue | — | 180 | 586 |
| 14 | " | isocyanurate[1] | 189 | isocyanurate[1] | 419 | 180 | 545 |

[1]Same as Example 1 but coating mixture 90 parts mixture "A" and 10 parts xylene.
[2]Same as Example 1 but coating mixture 100 parts mixture "A" and no xylene.
[3]Same as Example 1.
[4]Same as Example 1 but coating mixture 95 parts mixture "A" and 5 parts xylene.

TABLE V

| Example No. | Test Load (lbs.) | Number of Layers | Time to Remove Layers (sec.) | Grade |
|---|---|---|---|---|
| Control D | 8 (3.6 kg) | 3 | 84 | 180 |
| 10 | 8 | 3 | 79 | 180 |
| Control E | 8 | 5 | 111 | 80 |
| 11 | 8 | 5 | 120 | 80 |
| Control F | 5 (2.3 kg) | 5 | 60 | 60 |
| 12 | 5 | 5 | 54 | 60 |
| Control G | 8 | 3 | 87 | 120 |
| 13 | 8 | 3 | 90 | 120 |
| Control H | 8 | 2 | 73 | 180 |
| 14 | 8 | 2 | 58 | 180 |

EXAMPLES 15-16

"A" weight paper backing was coated with a mixture consisting of 90 parts mixture "A" and 10 parts xylene to provide a wet coating weight of 3 grains per 4-inch by 6-inch segment (126 mg per sq. decimeter). Twenty-four grains per 4-inch by 6-inch segment (1 g per sq. decimeter) of 180 grade aluminum oxide was electrostatically coated on the freshly coated surface and the composite cured for thirty seconds at 300° F. (150° C.). Several sheets of this composite were sized with a coating mixture consisting of 10 parts xylene and 90 parts mixture "A" (the lactate catalyst) to produce, on curing, coated abrasive hereinafter identified as Example 15. Several other sheets of the composite were size coated with mixture "B" (the borate catalyst) to produce, on curing, coated abrasive hereinafter identified as Example 16. The size coatings were cured for 10 minutes at 300° F. (150° C.). The coated abrasive samples were evaluated for abrasiveness as described in Example 1 but under dry grinding conditions. Results are set forth in Table VI below.

TABLE VI

| Ex. No. | Catalyst | Relative Abrasiveness* (%) | | |
|---|---|---|---|---|
| | | Panel 1 | Panel 2 | Panel 3 |
| 15 | lactate | 100 | 100 | 100 |
| 16 | borate | 115 | 67 | 105 |

*Relative to the coated abrasive containing isocyanurate cured with lactate catalyst.

EXAMPLE 17

A 3 mil thick coextruded polyester backing film consisting of a 2.75 mil thick layer of polyethylene terephthalate and a 0.25 mil thick layer of a polyester comprised of 80 parts ethylene terephthalate and 20 parts ethylene isophthalate was coated on its copolyester surface with 3-4 mils (wet) of a slurry described below.

| Parts | Slurry Component |
|---|---|
| 10 | Mixture "A" |
| 6 | Xylene |
| 30 | $Al_2O_3$ abrasive granule (9 microns) |

The resultant coated composite was cured for 1 minute in a forced air oven heated at 250° F. (120° C.), producing a coated abrasive sheet which was evaluated against a standard commercial coated abrasive product sold by the 3M Company under the trade designation "Imperial" Lapping Film (9 micron), employing a "Shuron" Random Motion Tester to polish a ¾-inch (19 mm) diameter stainless steel rod under a load of 25 lbs. (11 kg). The weight loss after 5 and ½ minutes of abrading time was noted. Results are as follows:

| Example | Wt. Loss (mg) |
|---|---|
| Control | 8.0 |
| Example 17 | 17.1 |

EXAMPLES 18-19

The film backing described in Example 17 and "A" weight paper backing were make coated with the lactate catalyst-containing coating composition described in Examples 15-16, grade 180 $Al_2O_3$ was electrostatically deposited on the make coating and the make coat was cured for 30 seconds at 300° F. (150° C.). The resultant composite was size coated with the same coating composition which was cured by heating for 30 minutes at 190° F. (88° C.) and then the resultant coated abrasives were coated with zinc stearate to a reflectance of about 800–900. Product specifications of these coated abrasives were as follows:

| Ex. No. | Backing | Make Resin mg/decimeter² | Size Resin mg/decimeter² | Reflectance | Mineral Weight g/decimeter² |
|---|---|---|---|---|---|
| 18 | film | 84 | 691 | 820 | 1.1 |
| 19 | paper | 126 | 440 | 910 | 0.8 |

Example 18 was evaluated for abrasiveness relative to Example 19 as described in Examples 15–16 with results as follows:

| Ex. No. | Relative Abrasiveness (%) | | |
|---|---|---|---|
| | Panel No. 1 | Panel No. 2 | Panel No. 3 |
| 18 | 136 | 123 | 110 |
| 19 | 100 | 100 | 100 |

What is claimed is:

1. In a coated abrasive product including abrasive granules which are supported on and adherently bonded to at least one major surface of a backing sheet by a make coating of a first resinous binder material and a size coating of a second resinous binder material, the improvement comprising at least one of the said resinous materials being polyisocyanurate resin, said isocyanurate resin being produced by trimerization of aromatic polyisocyanate and characterized by having dispersed throughout a plurality of minute capsules which are characterized by having permeable shell walls comprised of partially polymerized isocyanate and which may contain residual liquid catalyst for trimerization of said polyisocyanate, said permeable capsule shell wall being impermeable to said liquid catalyst at room temperature but permeable to said catalyst at temperatures above 50° C.

2. The abrasive product of claim 1 wherein said aromatic polyisocyanate is a polymethylene polyphenyl polyisocyanate.

3. The abrasive product of claim 1 wherein said liquid catalyst is a metal salt of an organic acid in a polyol solution.

4. The abrasive product of claim 1 wherein said liquid catalyst is potassium lactate in glycerol.

5. The abrasive product of claim 1 wherein said backing sheet is formed of paper, film, fiber, or woven cloth.

6. The abrasive product of claim 1 wherein said abrasive granules are selected from the group consisting of flint, garnet, aluminum oxide, alumina:zirconia, diamond, and silicon carbide.

7. The coated abrasive product of claim 1 wherein said first resinous binder is said isocyanurate and said second resinous binder is selected from a group consisting of said isocyanurate resin, varnish, epoxy resin, phenolic resin, and polyurethane.

8. The coated abrasive product of claim 1 wherein said first resinous binder is selected from the group consisting of said isocyanurate, glue, varnish, epoxy resin, phenolic resin, and polyurethane and said second resinous binder is said isocyanurate resin.

9. In a coated abrasive product including abrasive granules which are supported on and adherently bonded to at least one major surface of a backing sheet by a resinous binder material, the improvement comprising polyisocyanurate resin as the resinous binder material, said isocyanurate resin being produced by trimerization of aromatic polyisocyanate and characterized by having dispersed throughout a plurality of minute capsules which are characterized by having permeable shell walls comprised of partially polymerized isocyanate and which may contain residual liquid catalyst for trimerization of said polyisocyanate, said permeable capsule shell wall being impermeable to said liquid catalyst at the room temperature but permeable to said catalyst at temperatures above 50° C.

10. In a method of making coated abrasive products having the steps of
(1) uniformly coating a backing sheet with a make coat of a first resinous material in liquid form;
(2) depositing a plurality of abrasive granules uniformly over the surface of said make coat of first resinous material;
(3) curing said first resinous material to adherently bond said granules to said backing sheet surface;
(4) coating over said make coat and said granules with a size coat of a second resinous material; and
(5) curing the resultant coated product until said second resinous material is solid,
the improvement comprising employing, as at least one of said first or said second resinous binder materials, a latent room-temperature stable, curable system comprised of
(A) an aromatic polyisocyanate material and
(B) a liquid catalyst having a viscosity greater than about 5,000 centipoise at 25° C. for the trimerization of said polyisocyanate material dispersed throughout said mixture, said liquid catalyst being encapsulated in a plurality of minute capsules having a permeable shell wall comprising partially polymerized isocyanate, said permeable capsule shell wall being impermeable to said liquid catalyst at room temperature but permeable to said catalyst at temperatures above 50° C. and said curing is effected by applying an activating force to cause the liquid catalyst to permeate the shell walls and catalyze the isocyanate to isocyanurate.

11. The method of claim 10 wherein said activating force is provided by heating the isocyanate-catalyst system to a temperature above 50° C.

* * * * *